(12) United States Patent
Chang et al.

(10) Patent No.: US 11,730,301 B2
(45) Date of Patent: Aug. 22, 2023

(54) STEAM COOKING DEVICE

(71) Applicant: TEAM YOUNG TECHNOLOGY CO., LTD., Taoyuan (TW)

(72) Inventors: Chia-Chi Chang, Taoyuan (TW); Chao-Yu Hung, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 472 days.

(21) Appl. No.: 17/128,214

(22) Filed: Dec. 21, 2020

(65) Prior Publication Data

US 2021/0235915 A1 Aug. 5, 2021

(30) Foreign Application Priority Data

Feb. 5, 2020 (TW) .................................. 109103604

(51) Int. Cl.
*A47J 27/04* (2006.01)
*A47J 27/21* (2006.01)
*A47J 36/32* (2006.01)
*F22B 1/28* (2006.01)

(52) U.S. Cl.
CPC ......... *A47J 27/04* (2013.01); *A47J 27/21008* (2013.01); *A47J 27/21166* (2013.01); *A47J 36/32* (2013.01); *F22B 1/28* (2013.01); *A47J 2027/043* (2013.01); *A47J 2203/00* (2013.01)

(58) Field of Classification Search
None
See application file for complete search history.

(56) References Cited

U.S. PATENT DOCUMENTS

| | | | |
|---|---|---|---|
| 2007/0227364 | A1 | 10/2007 | Andoh et al. |
| 2010/0230397 | A1* | 9/2010 | Ohashi ..................... A21B 3/04 |
| | | | 219/401 |
| 2022/0000299 | A1* | 1/2022 | Vaupot ..................... A47J 27/04 |
| 2022/0079371 | A1* | 3/2022 | Huang ....................... A23L 5/13 |

FOREIGN PATENT DOCUMENTS

| | | | | |
|---|---|---|---|---|
| CN | 202681613 | | 1/2013 | |
| CN | 204995191 | | 1/2016 | |
| CN | 108030386 | A * | 5/2018 | ............ A47J 27/004 |

* cited by examiner

*Primary Examiner* — John J Norton
(74) *Attorney, Agent, or Firm* — JCIPRNET

(57) ABSTRACT

A steam cooking device which includes a pressure accumulating steam boiler and a steaming cabinet is disclosed. The pressure accumulating steam boiler heats liquid water and accumulates a steam having a pressure between 1.1 and 5.0 times atmospheric pressure. The steaming cabinet receives the steam from the pressure accumulating steam boiler to cook a foodstuff contained therein. To raise the temperature of a foodstuff accommodating chamber within the steaming cabinet from a room temperature to a cooking temperature, a WH1 amount of energy is consumed by an electricity-heat conversion unit in the pressure accumulating steam boiler. A foodstuff accommodating chamber within the steaming cabinet has a volume of V1. The steam cooking device satisfies V1/WH1>160. The cooking temperature is between 101° C. and 150° C. and is lower than or equal to the temperature of the steam when the steam is outputted from the pressure accumulating steam boiler.

10 Claims, 4 Drawing Sheets

STEAM COOKING DEVICE

CROSS-REFERENCE TO RELATED APPLICATION

This application claims the priority benefit of Taiwan application serial no. 109103604, filed on Feb. 5, 2020. The entirety of the above-mentioned patent application is hereby incorporated by reference herein and made a part of this specification.

BACKGROUND

Technical Field

The disclosure relates to a steam cooking device, and in particular to a steam cooking device that effectively reduces the time required to cook the foodstuff.

Description of Related Art

When being used to cook the foodstuff, existing cooking equipment such as steam boilers, ovens, or superheated steam ovens often cause the foodstuff to be dry, charred, or unevenly heated. The reason for the aforementioned is that when the heating device in the cooking device is in the heating-up period, the foodstuff facing the heating plate or the superheated steam nozzle receives much more heat than the other parts of the foodstuff, which causes parts of the foodstuff to be dry, charred, and unevenly heated, and the quality of the foodstuff may not be effectively controlled.

In order to solve the aforementioned issue, the power of the heating plate or the output of the superheated steam may be reduced to slow down the heating-up speed of the steamer chamber and achieve an even temperature in all parts of the steamer chamber. However, taking fish meat as an example, the process of cooking fish meat at a relatively low temperature for a long period of time causes the meat of the foodstuff to become tough. Furthermore, when the ambient temperature of the steamer chamber is slowly rising, it is difficult to control the impact of the temperature on the foodstuff; therefore, in order for consumers to thoroughly cook the foodstuff, a longer cooking time is usually required, which causes the foodstuff to become too tough.

In order to solve the aforementioned issue, a well-known method is to "preheat" the steamer chamber and not to open the boiler door to put the foodstuff in until the steamer chamber temperature reaches the cooking temperature, the purpose of which is to minimize the impact on the foodstuff during the heating-up period of the steamer chamber. However, the "preheating" procedure is relatively complicated and inconvenient for users. Moreover, even if the steamer chamber is preheated to reduce the impact on the foodstuff during the heating-up period, the main cooking method today, which is utilizing temperature diffusion to simmer the foodstuff, has a slow cooking rate. Therefore, the entire cooking period is still too long, which causes the foodstuff to be too tough.

In summary, if the steamer chamber is heated up quickly with a high power, the foodstuff is likely to be dry or charred on the surface or unevenly heated. On the other hand, if the steamer chamber is heated with a low power, the cooking time is longer, which causes a difficulty in accurately controlling the cooking of the foodstuff, and the foodstuff often becomes too tough. Also, if the steamer chamber is "preheated" beforehand, the user would have to wait for a long period of time, and the procedure is complicated, which may easily cause confusion and inconvenience to the user. Currently no existing cooking device is present to help overcome all the aforementioned issues.

For example, as disclosed in the China Patent No. CN202681613U, "Energy-saving circulating steamer," water vapor, generated by heating water, contacts and heats the foodstuff. However, in this type of equipment, the water vapor in the gaseous state in the steam may be easily transformed into liquid water molecules due to various reasons during the transportation process, which causes the steam to be likely to form a liquid water film on the surface of the foodstuff, which reduces the heating efficiency of the foodstuff, and prevents the cooking speed from being increased.

Another type of steam cooking equipment is, for example, an equipment with a high-temperature steam cooking function, such as a superheated steam oven, which often includes two functions: pure steaming and superheated steam steaming. The pure steaming function of most of the known superheated steam ovens of various brands is to generate water vapor with atmospheric steam boilers (with 1 atmospheric pressure) and directly deliver the water vapor into the steamer chamber at the atmospheric pressure to cook the foodstuff. This function also has the issue of a liquid water film coating the foodstuff. On the other hand, the superheated steam steaming function is usually to utilize a heating unit to further heat the steam during the water vapor's transportation to the steamer chamber or after the water vapor enters the steamer chamber after the water vapor is generated, so that the steam becomes a superheated steam. For example, as disclosed in the US Patent No. US20070227364A1 "Steam Cooker," a superheated steam is used to achieve the purpose of "steaming."

However, the temperature of the superheated steam is often over 200° C. When the superheated steam contacts the surface of the foodstuff, it quickly evaporates the moisture on the surface of the foodstuff, causing the surface of the foodstuff to be dry or even charred, which results in the aforementioned issue of the foodstuff being dry or charred. Even "preheating" the steamer chamber beforehand may not lead to a satisfying effect of cooking the foodstuff.

Furthermore, some related designs utilize high-pressure steam ovens to provide a steam having a pressure of multiple times the atmospheric pressure (10 times the atmospheric pressure, for example) for cooking. However, the high-pressure steam ovens cause a high security risk, and the costs of the high-pressure steam ovens have increased significantly due to security requirements, which lead to difficulties in product pricing.

In summary, in the existing prior art, no cooking device that can quickly cooks multiple dishes, and accurately controls the heating degree and the cooking effect of the foodstuff, and therefore the cooking results of the foodstuff can be accurately reproduced and controlled without having the needs to preheat, to utilize a high temperature, and to enlarge the foodstuff accommodating chamber is present. The disclosure aims to meet the aforementioned criteria.

SUMMARY

In response to the aforementioned issues, in an embodiment of the disclosure, a steam cooking device that quickly cooks multiple dishes, accurately controls the heating degree and the cooking effect of the foodstuff, and therefore the cooking results of the foodstuff cab be accurately reproduced and controlled without having the needs to preheat, to utilize a high temperature, and to enlarge the foodstuff accommodating chamber is provided.

Different from the design in the prior art in which high-power heating plates or high-temperature superheated steam is used to quickly heat the foodstuff accommodating chamber, in the steam cooking device of the disclosure, a high-pressure steam which contains latent heat is used to heat the foodstuff. In this way, the risk of the foodstuff becoming dry or charred due to the overheated steam or the heating plate is avoided, and since the high-pressure steam has a higher saturated vapor temperature and a faster releasing speed, the steam may quickly fill up and heat the steamer chamber of the steaming cabinet when the steam enters the near atmospheric foodstuff accommodating chamber, so as to maximize the heating-up rate of the foodstuff accommodating chamber in the steamer chamber. In an embodiment of the disclosure, the preheating procedure may be omitted, and the issues of the foodstuff becoming dry or charred due to high-temperature heating and poor cooking of foodstuff caused by slow heating or poor heating efficiency may be solved.

In addition, in order to make the aforementioned and other purposes, features, and advantages of the disclosure comprehensible, exemplary embodiments accompanied with drawings are described in detail below. However, a person of ordinary skill in the relevant field of the disclosure should be able to understand that these detailed descriptions and specific embodiments of the disclosure are only used to illustrate the disclosure, and are not intended to limit the scope of the patent application of the disclosure.

DESCRIPTION OF THE EMBODIMENTS

Figure 1:
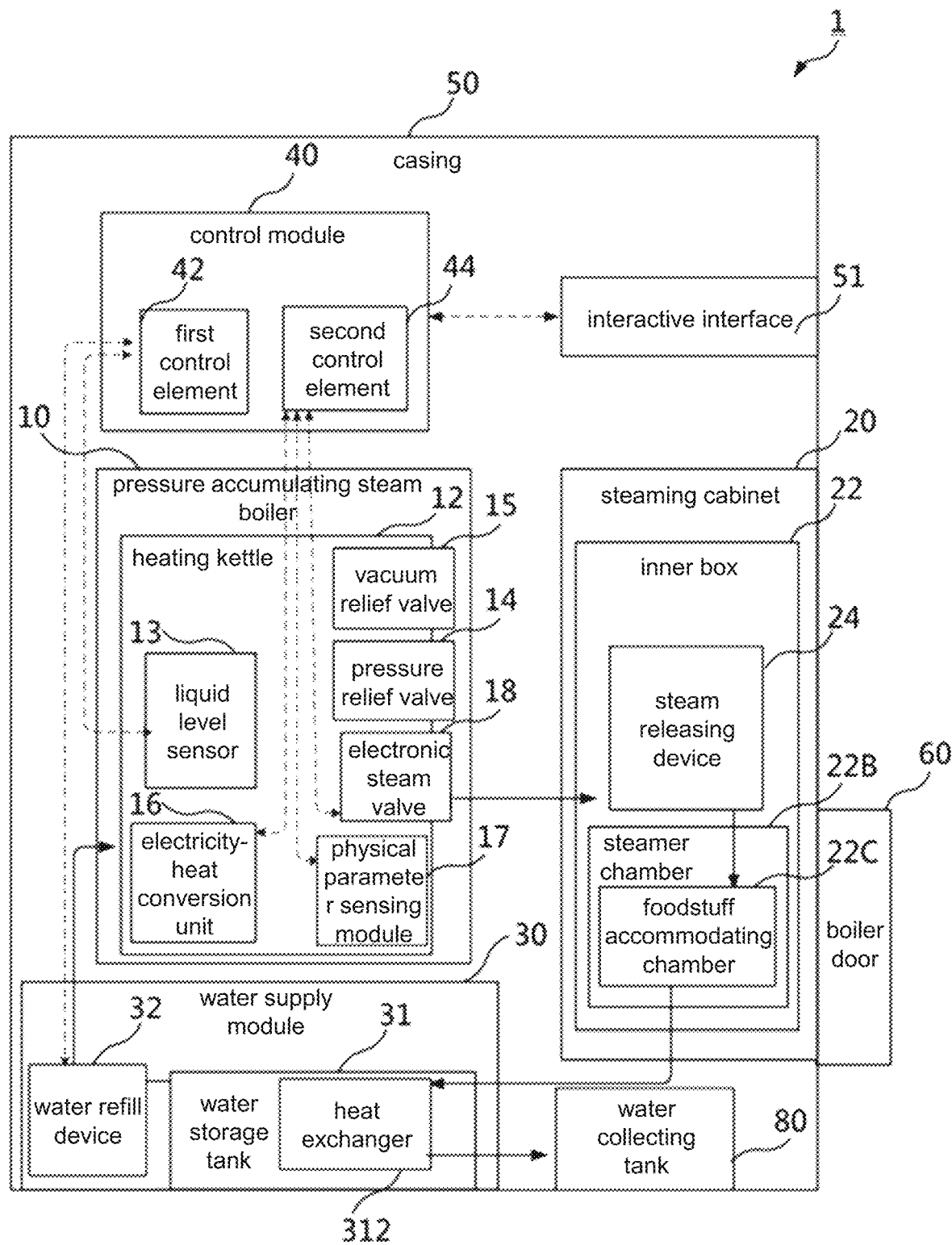
FIG. 1 is a function block diagram of a steam cooking device according to a specific embodiment of the disclosure.

Hereinafter, exemplary embodiments are listed corresponding to the drawings to illustrate components, operations, and effects of a steam cooking device of the disclosure. However, the components, sizes, and appearances of the steam cooking device in the drawings only illustrate the technical features of the disclosure and do not limit the disclosure.

Figure 2:
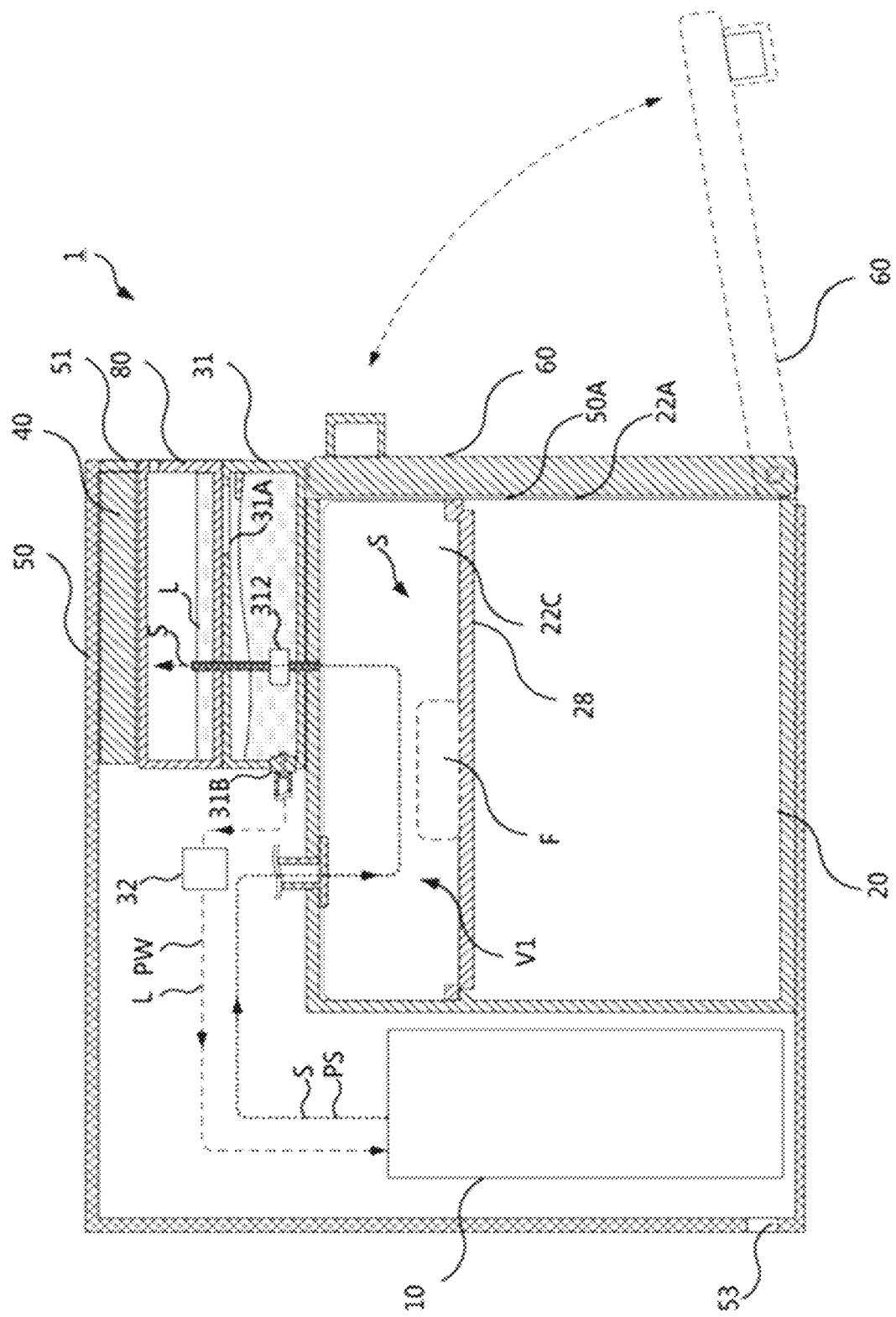
FIG. 2 is a schematic view of the relative positions of various components of the steam cooking device and a flow direction of a water path according to a specific embodiment of the disclosure.
Figure 3:
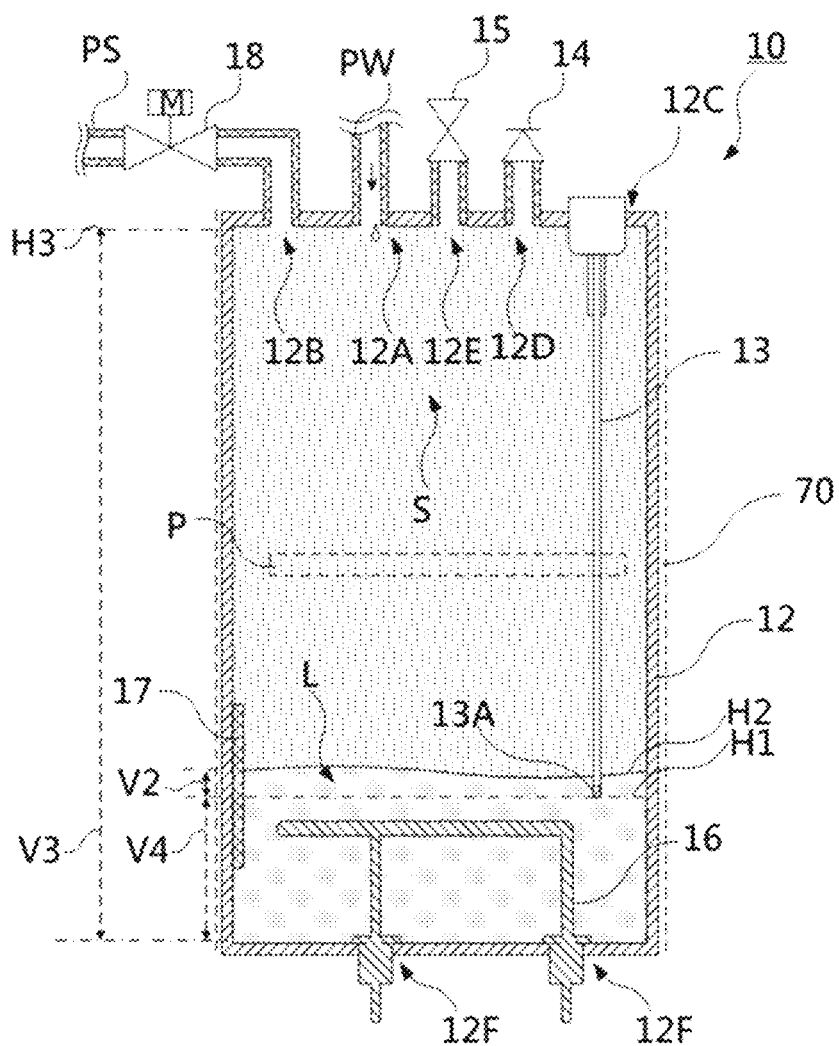
FIG. 3 is a schematic cross-sectional view of a pressure accumulating steam boiler according to a specific embodiment of the disclosure.
Figure 4:
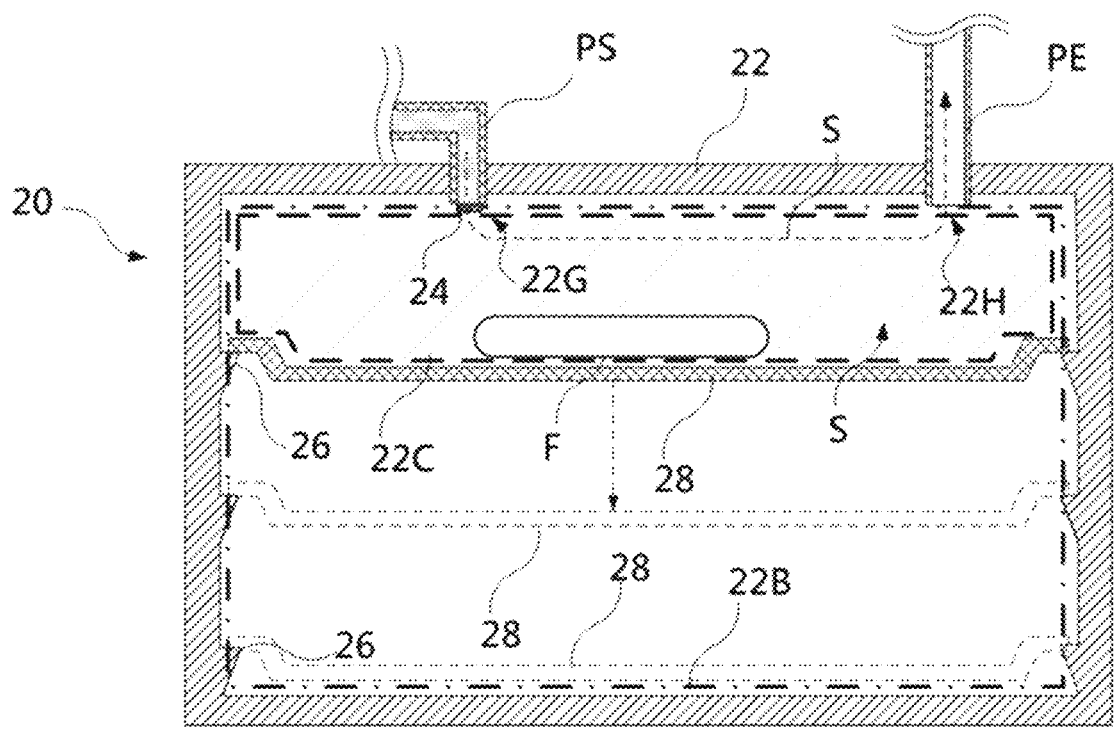
FIG. 4 is a schematic cross-sectional view of a steaming cabinet according to a specific embodiment of the disclosure.

Referring to FIG. 1 to FIG. 4, FIG. 1 is a function block diagram of a steam cooking device according to an embodiment of the disclosure; FIG. 2 is a schematic view of the relative positions of various components of the steam cooking device and a flow direction of a water path according to an embodiment of the disclosure; FIG. 3 is a schematic cross-sectional view of a pressure accumulating steam boiler according to an embodiment of the disclosure; and FIG. 4 is a schematic cross-sectional view of a steaming cabinet according to an embodiment of the disclosure.

First, a steam cooking device 1 of the disclosure generally refers to any devices that consume electric energy to generate a steam S, and utilize the steam S to cook a foodstuff F. The steam cooking device 1 of the disclosure may be configured independently in the form of an electric steam boiler, or may be combined with other heating means, such as a microwave electricity-heat conversion unit, a heating plate, etc., and then be presented in the form of devices such as a multi-functional superheated steam oven.

Before an operation method of the disclosure is described, the physical design of the steam cooking device 1 is described. In this embodiment, the steam cooking device 1 is an electric steam boiler, and a foodstuff accommodating chamber 22C thereof is not required to be equipped with microwave heating or heating plate heating functions. Referring to FIG. 1 and FIG. 2 together, FIG. 1 and FIG. 2 show that the steam cooking device 1 at least includes main components including a pressure accumulating steam boiler 10, a steaming cabinet 20, a water supply module 30, a control module 40, a casing 50, a boiler door 60, a water collecting tank 80, etc. Among the aforementioned, units that are not the focus of the disclosure, such as a power supply, are appropriately omitted, but should be used in application.

FIG. 2 shows that the water supply module 30 may be configured to store and provide a liquid water L to the pressure accumulating steam boiler 10; the pressure accumulating steam boiler 10 may be configured to heat the liquid water L to generate the steam S and supply the steam S to the steaming cabinet 20; and the steaming cabinet 20 may be configured to utilize the steam S provided by the pressure accumulating steam boiler 10 to heat and cook the foodstuff F. The control module 40 may be configured to control electrically controlled units including the water supply module 30, the pressure accumulating steam boiler 10, and the steaming cabinet 20 to complete the aforementioned cooking procedure. The casing 50 may be configured to accommodate the aforementioned components and fix the relative positions thereof. The water collecting tank 80 may be configured to collect the steam S discharged from the steaming cabinet 20 and store the steam S in the form of liquid water. A specific design of the steam cooking device 1 of the embodiment of the disclosure is illustrated as follows.

Referring to FIG. 2, FIG. 2 shows that the front of the casing 50 has a lateral opening 50A connected to a central hollow part and one or more notches 53 for components such as water pipes and wires to enter into the casing 50. An interactive interface 51 is provided on the front side surface of the casing 50 for user interaction. The interactive interface 51 may include various known input-output devices.

Referring to FIG. 2, the water supply module 30 includes a water source, a water refill device 32, and a water supply pipe PW. In this embodiment, the water source is a water storage tank 31, which generally refers to a container that may be configured to contain the liquid water L. The water storage tank 31 is equipped with a water supply channel 31B connecting the inside and outside of the water storage tank 31. The water supply channel 31B is connected to the pressure accumulating steam boiler 10 through the water supply pipe PW. The water refill device 32 is configured between the water supply pipe PW and the pressure accumulating steam boiler 10 to supply the water in the water storage tank 31 to the pressure accumulating steam boiler 10. Also, a heat exchanger 312 may be configured in the water storage tank 31.

The water refill device 32 generally refers to a device that connects the water source and the pressure accumulating steam boiler 10 and is configured to supply the liquid water L to the pressure accumulating steam boiler 10. For example, the water refill device 32 may be a device that provides pressure to the liquid water L, such as a water pump, an electromagnetic pump, a DC motor, etc., but is not limited thereto. The water refill device 32 may also be a unit with a flow control capability. For example, when the water source is a device with sufficient pressure such as a tap water pipe, units that do not provide a pressurizing function such as an electronic valve or a controllable water meter may be configured as the water refill device 32. In this embodiment, the water refill device 32 is an electromagnetic pump with only one way of water supply capability. The electromagnetic pump in this embodiment allows the liquid water L to enter and be pressurized to have a pressure higher than a predetermined pressure accumulating pressure of the pressure accumulating steam boiler 10 and then be outputted, so that the liquid water L enters the heating kettle 12 without being affected by the high pressure in the pressure accumulating steam boiler 10.

Referring to FIG. 3, FIG. 3 is a schematic view of a pressure accumulating steam boiler according to an embodiment of the disclosure. The pressure accumulating steam boiler 10 generates and safely accumulates a high-temperature steam S which has a pressure of multiple times the atmospheric pressure. In this embodiment, the pressure accumulating steam boiler mainly includes main components including a heating kettle 12, a liquid level sensor 13, a pressure relief valve 14, a vacuum relief valve 15, an electricity-heat conversion unit 16, a physical parameter sensing module 17, and an electronic steam valve 18. In this embodiment, each of the aforementioned units and an outer wall of a pipe connecting the aforementioned units may be optionally wrapped with an insulating layer 70 to reduce heat dissipation.

An accommodating space is present in the heating kettle 12 (also referred to as the vapor chamber), and both the liquid water L and the steam S may be stored therein at the same time. The heating kettle 12 is required to withstand a high pressure, and the high pressure refers to a pressure greater than or equal to 1.1 times the atmospheric pressure. A maximum internal pressure that the heating kettle 12 loads is less than 10 times the atmospheric pressure. For example, a structure of the heating kettle 12 in this embodiment is an enclosed cylindrical steam boiler made of steel, and a maximum working pressure thereof is 5 times the atmospheric pressure. In addition, during application, there is no specific limitation to the internal volume of the heating kettle 12 of the disclosure. The internal volume of the heating kettle 12 may be increased correspondingly as the power of the electricity-heat conversion unit 16 increases, and vice versa. That is, the internal volume of the heating kettle 12 may be designed diversely according to the power of the electricity-heat conversion unit 16. For example, in this embodiment, the rated power of the electricity-heat conversion unit 16 is about 1.5 kW, and a volume of the heating kettle 12 in the pressure accumulating steam boiler 10 is about 1.155 liters.

As depicted in FIG. 3, in this embodiment, a top surface of the heating kettle 12 is equipped with a first port 12A, a second port 12B, a third port 12C, a fourth port 12D, and a fifth port 12E. The first port 12A is a water inlet, and a water supply pipe PW is configured to connect to a water storage tank 31 to receive the liquid water L; the second port 12B is a steam outlet connected to the electronic steam valve 18 to output the steam S. The third port 12C is configured to fix the liquid level sensor 13 and allow liquid level sensor 13 to extend into the heating kettle 12 through the third port 12C; the fourth port 12D is configured to fix the pressure relief valve 14; and the fifth port 12E is configured to fix the vacuum relief valve 15. Multiple sixth ports 12F are configured on the bottom surface of the heating kettle 12 to allow each electrode of the electricity-heat conversion unit 16 to pass through. Each of the aforementioned ports may be kept substantially watertight and airtight in an environment of the heating kettle 12 which has a predetermined pressure accumulating pressure. The aforementioned predetermined pressure accumulating pressure means that after the pressure inside the heating kettle 12 reaches a specific pressure during a pressure accumulating period, the electricity-heat conversion unit 16 stops heating or reduces the heating power, so as to allow the pressure in the heating kettle 12 to maintain at a specific value. The specific value is the predetermined pressure accumulating pressure, and a corresponding saturated vapor temperature is referred to as a predetermined pressure accumulating temperature. When the temperature of the steam accumulated in the pressure accumulating steam boiler is between 110° C. and 130° C., the effect is improved. In this embodiment, the predetermined pressure accumulating pressure is about 2 times the atmospheric pressure, and the corresponding predetermined pressure accumulating temperature is about 120° C.

The aforementioned liquid level sensor 13 (also referred to as the liquid level gauge) refers to an electronic device that may be configured to detect the height of a liquid surface and then output a corresponding signal. The liquid level sensor 13 may come in many forms, such as an electronic water level gauge including multiple exposed electrodes, or a liquid surface electrode rod (also referred to as an electrode probe). The liquid surface electrode rod may be designed to be single-tube (monopole) or multi-tube (multi-pole). A multi-tube liquid surface electrode rod includes multiple (such as two, three, etc.) electrode rods with different lengths.

In this embodiment, the liquid level sensor 13 is a monopole liquid surface electrode rod which measures whether the liquid surface has reached a lowest sensing point thereof. In this embodiment, the length of the liquid level sensor 13 in the heating kettle 12 is slightly less than or equal to 114.5 mm. After the liquid level sensor 13 is installed, the distance between a sensing point 13A at the lowest end of the liquid level sensor 13 and the bottom of the heating kettle 12 is about 35.5 mm. That is, when the liquid level is lower and higher than 35.5 mm, the liquid level sensor 13 outputs a corresponding water level signal respectively to indicate that the liquid level has not reached or has reached a lowest predetermined water level height H1, or a predetermined height or a water injection line for short. After processing, the aforementioned water level signal may be adapted for a warning when the liquid level is too low. The length of the liquid level sensor 13 may be adjusted according to the desired liquid surface height, and is not limited in the disclosure. In this embodiment, the length or the position of the liquid level sensor 13 is relative to the predetermined height H1 of the lower limit of the liquid level.

The electricity-heat conversion unit 16 generally refers to multiple devices, modules, or units that consume electric energy and output thermal energy. For example, the electricity-heat conversion unit 16 may be an electric heating tube, an electric resistance heater with an electric heating plate, etc. In this embodiment, the electricity-heat conversion unit 16 is flat.

Specifically, the electricity-heat conversion unit 16 is a 110V and 15A electric heating tube in the shape of a mosquito coil with a power of about 1.5 kW. The electricity-heat conversion unit 16 occupies a volume of about 29 ml in the heating kettle 12. The electric heating tube in the shape of a mosquito coil has two electrodes and a heating part mainly formed by resistors. Furthermore, in the application of the electricity-heat conversion unit 16, when the heating part thereof is close to the liquid surface of the heating kettle 12 but the electricity-heat conversion unit 16 is entirely submerged below the liquid surface or the predetermined height of the liquid level sensor 13, the heating efficiency of the electricity-heat conversion unit 16 is improved.

The aforementioned physical parameter sensing module 17 refers to a sensor that senses the temperature or air pressure of the environment thereof and outputs a signal correspondingly, such as an electronic thermometer or an electronic pressure meter.

The aforementioned electronic steam valve 18 refers to a device, module, or unit that may be controlled by an electronic signal to open and close and allow the steam S to pass through. In this embodiment, the electronic steam valve 18 includes a motor and a ball valve. The motor drives the ball valve to rotate along with a sphere with a channel in the center thereof. The angle between the axis of the channel in the center of the sphere and the axis of a steam inlet channel is referred to as an opening degree. The opening degree may be adjusted freely in multi-stages as required. In this embodiment, the electronic steam valve 18 receives the electronic signal of a second control element 44 in the control module 40 to adjust the opening degree to adjust the steam supply volume from the pressure accumulating steam boiler 10 to the steaming cabinet 20. In this embodiment, the accumulating pressure and temperature in the heating kettle 12 are about twice the atmospheric pressure and 120° C. respectively. When the opening degree of the electronic steam valve 18 is 60 degrees, 55 degrees, 50 degrees, and 45 degrees, the steaming cabinet 20 is maintained at a cooking temperature of about 104° C., 107° C., 110° C., and 113° C., also referred to as a steady-state temperature. The larger the opening of the electronic steam valve 18 is (the smaller the opening degree is), the higher the steady-state temperature of the steaming cabinet 20 is. The cooking temperature in the steaming cabinet 20 may thereby be adjusted by adjusting the steam supply of the electronic steam valve 18.

Referring to FIG. 4, FIG. 4 is a schematic view of the steaming cabinet 20 according to an embodiment of the disclosure. The steaming cabinet 20 is configured to receive the steam S from the pressure accumulating steam boiler 10 to cook the foodstuff F in the steaming cabinet 20. The steaming cabinet 20 mainly includes main components such as an inner box 22, a steam releasing device 24, etc.

The inner box 22 is configured with a side opening 22A, and an accommodating space referred to as a steamer chamber 22B is configured in the inner box 22, which is adapted for cooking the foodstuff F. The side walls in the inner box 22 may be configured with multiple ribs 26 or corresponding units which are adapted for carrying movable units 28. The movable units 28 may be trays or partitions, etc. The steamer chamber 22B is connected to the electronic steam valve 18 through a seventh port 22G and a steam pipe PS. The steamer chamber 22B refers to all the accommodating spaces in the inner box 22. The main part of the steamer chamber 22B that receives the steam S and is adapted for cooking the foodstuff F is defined as a foodstuff accommodating chamber 22C.

The steam releasing device 24 is configured between the seventh port 22G and the steamer chamber 22B, and is adapted for inputting the steam S from the heating kettle 12 into the foodstuff accommodating chamber 22C. The steam releasing device 24 may refer to the opening of the inner walls of the inner box 22, or to an independent element configured at the seventh port 22Q such as a perforated sheet or a nozzle. In this embodiment, the steam releasing device 24 refers to an opening on the inner box 22. In addition, the steam S may be freely outputted from the steamer chamber 22B through an eighth port 22H and an exhaust pipe PE connected thereto. The difference between the temperature of the steam S released by the steam releasing device 24 and the saturated vapor temperature in the pressure accumulating steam boiler 10 is no more than 30° C.

Referring to FIG. 2 again, FIG. 2 shows that in this embodiment, a water collecting tank 80 is adapted for receiving the steam S cooled by the water storage tank 31 from the exhaust pipe PE. A gap may optionally be configured between the water collecting tank 80 and the casing 50 for the aforementioned steam S to be discharged.

Referring to FIG. 1, the control module 40 refers to a device adapted for controlling any one of the aforementioned components. The control module 40 may include, for example, the first control element 42 and the second control element 44. Each of the control elements may be an independent unit; for example, each of the control elements may operate independently in an individual loop without connecting to each other. On the other hand, each of the control elements may also be different units on a single circuit board or may be integrated into a same unit, and the disclosure is not limited thereto. Furthermore, each of the control elements may be a digital or analog unit or a module adapted for receiving signals and outputting corresponding signals after processing, such as a central processing unit, an MCU, a single chip, a PCL, etc. In this embodiment, the first control element 42, also referred to as the automatic water refill element, is electrically connected to the liquid level sensor 13 and the water refill device 32. The first control element 42 is adapted for controlling the water refill device 32 to supplement the liquid water L to the heating kettle 12 according to the water level signal of the liquid level sensor 13. The second control element 44, also referred to as the steam supply element, is electrically connected to at least the interactive interface 51, the electricity-heat conversion unit 16, the physical parameter sensing module 17, and the electronic steam valve 18. The second control element 44 is adapted for controlling the electricity-heat conversion unit 16 to heat the liquid water and controlling the electronic steam valve 18 to output steam according to the signal of the physical parameter sensing module 17.

The operation process of the steam cooking device 1 is described as follows. The operation process of the steam cooking device 1 sequentially includes a water injection mode, a standby mode, a steam storage mode, a steaming mode, and a shutdown mode.

The following describes an example of the water injection mode. For example, when the steam cooking device 1 is connected to a power source, the device enters the water injection mode and executes a water injection procedure automatically or according to a user's instruction. During the water injection procedure, the first control element 42 determines whether the water level has reached the predetermined height H1 (also referred to as the water injection line) according to the water level signal of the liquid level sensor 13. If the water level has reached the predetermined height H1, the first control element 42 does not act, while if the water level has not reached the predetermined height H1, the first control element 42 executes a water injection procedure. In the water injection procedure, the first control element 42 activates the water refill device 32 to inject the liquid water L from the water source into the heating kettle 12 through the first port 12A located on the top surface of the heating kettle 12. Once the liquid surface reaches the predetermined water level height H1, a predetermined water refill volume of liquid water is further injected into the heating kettle 12 to raise the liquid surface from the lowest predetermined water level height H1 to the highest water refill water level height H2 (also referred to as the maximum water line). In this embodiment, the predetermined water refill volume is a fixed amount, and for this purpose, the activation time of the water refill device 32 is also fixed.

In this embodiment, the water source is the water storage tank 31, and the water storage tank 31 is configured with a water tank opening 31A for adding water. However, the water source may also be a tap water supply pipe, and is not limited thereto. In addition, in this embodiment, a water pump with a no-load flow rate of about 500 ml per minute is selected as the water refill device 32. In this embodiment, from the empty water level to the lowest predetermined water level height H1, a total of about 269 ml of water is injected in about 37 seconds; from the lowest predetermined water level height H1 to the highest water refill water level height H2, a total of 44 ml of water is injected in about 6 seconds. During the entire water injection procedure, a total of about 313 ml of water is injected.

The ratio (V4/W1) of a liquid water volume (V4) in the heating kettle 12 at the predetermined height H1 to the rated power (W1) of the electricity-heat conversion unit 16 may be controlled to be less than or equal to 0.4 liter/kW, 0.3 liter/kW, 0.2 liter/kW, and 0.1 liter/kW. In this embodiment, the water volume below the predetermined height H1 of the liquid level sensor 13 is about 0.269 liter. The rated power of the electricity-heat conversion unit 16 is 1.5 kW. The ratio of the liquid water volume V4 at the predetermined height H1 in the heating kettle 12 to the rated power (W1) of the electricity-heat conversion unit 16 is about 0.18 liter/kW.

On the other hand, in response to a low water volume, the electricity-heat conversion unit 16 of this embodiment is designed to be flat, which may be entirely submerged below the liquid surface, which improves heating efficiency.

In an embodiment, after a user energizes the steam cooking device 1, during the water injection procedure, the steam cooking device 1 may optionally enter either the standby mode (also referred to as the first preparation mode) or the steam storage mode (also referred to as the second preparation mode) according to predetermined parameters. When the steam cooking device 1 enters the standby mode, the second control element 44 controls the electricity-heat conversion unit 16 to heat the liquid water L in the heating kettle 12 with its maximum rated power. After the physical parameter sensing module 17 releases a piece of data that indicates that the preliminary temperature of the liquid water L is between 60° C. and 99° C., for example, the electricity-heat conversion unit 16 is controlled to be turned on and off in a timely manner to allow the liquid water L therein to maintain at the preliminary temperature. An exemplary preliminary temperature is lower than the saturated vapor temperature in the heating kettle 12 to allow the liquid water L in the heating kettle 12 to be substantially maintained in a liquid state.

In the steam storage mode (also referred to as the second preparation mode), the second control element 44 controls the electricity-heat conversion unit 16 to heat the liquid water L in the heating kettle 12 with a full power to allow the liquid water L to quickly reach the predetermined pressure accumulating temperature from a temperature lower than the predetermined pressure accumulating temperature (20° C. of room temperature or the preliminary temperature of the first preparation mode, for example) and to generate the steam S that corresponds to the predetermined pressure accumulating temperature. An exemplary predetermined accumulating pressure is between 1.1 and 5.0 times the atmospheric pressure, and the corresponding saturated vapor temperature is between 103° C. and 152° C. At the same time, it is also necessary to control the electricity-heat conversion unit 16 to be turned on and off in a timely manner to allow the steam S therein to maintain at the predetermined pressure accumulating pressure or the predetermined pressure accumulating temperature. In this embodiment, the predetermined pressure accumulating temperature corresponds to about twice the atmospheric pressure. That is, when the pressure accumulation is completed, the steam in the heating kettle 12 is at the saturated vapor temperature of about 120° C.

When the steaming mode starts, the second control element 44 controls the electronic steam valve 18 to open the channel and allows the saturated vapor S to enter the foodstuff accommodating chamber 22C through the steam releasing device 24 to cook the foodstuff F. The steam cooking device 1 may be allowed to enter the shutdown mode according to the instruction inputted by the user. In the shutdown mode, a liquid water heat preservation function in the heating kettle 12 is turned off.

An application scenario of the steam cooking device 1 of this embodiment is explained as follows. In this embodiment, when the steam cooking device 1 is energized, the system executes the water injection procedure and confirms that the heating kettle 12 has liquid water, after which the steam cooking device 1 omits the standby mode and automatically enters the steam storage mode to start producing and storing steam. Next, after the user puts the foodstuff F to be cooked into the steamer chamber 22B, closes the boiler door 60, and selects a cooking procedure of the steam cooking device 1 by operating the interactive interface 51, the steam cooking device 1 enters the steaming mode and outputs the steam S to the steamer chamber 22B to cook the foodstuff F according to the different cooking procedures. After the cooking procedure ends, the user may open the boiler door 60 and take out the foodstuff F. The entire cooking process is thus completed. The system then re-enters either the standby mode or the steam storage mode according to the predetermined process. In addition, after the user energizes the steam cooking device 1, the steam cooking device 1 may also enter the standby mode first, and enter the steam storage mode once the user inputs a command through the interactive interface 51 or opens the boiler door 60.

In this embodiment, the preliminary temperature in the standby mode is 80° C. When the electricity-heat conversion unit 16 with the rated power of 1.5 kW in this embodiment is applied with the aforementioned liquid water volume, it only takes 1.5 minutes to raise the temperature of the liquid water L from the room temperature 20° C. to 80° C. If the steam storage mode is directly selected, it only takes 2.5 minutes to raise the room temperature from 20° C. to 120° C. at twice the atmospheric pressure. In this embodiment, when the steam cooking device 1 enters the steaming mode, the heating kettle 12 provides steam to the steaming cabinet immediately because the device has already completed steam storage in the steam storage mode, which saves about 2.5 minutes of preparation time. In addition, if the steam cooking device 1 is designed to enter the standby mode first and the steam storage mode later, since the liquid water L has been preheated to 80° C., it only takes about 1 minute to heat the liquid water L to the predetermined pressure accumulating temperature, which reduces the time required to produce the steam S to a certain extent.

In order to further reduce the volume of the foodstuff accommodating chamber 22C while retaining the flexibility of application, the disclosure utilizes the movable unit 28 configured in the steaming cabinet 20 to divide the steamer chamber 22B into an area where the steam S is mainly released and an area where the steam S is not released to further reduce the time required for heating the foodstuff accommodating chamber 22C to the cooking temperature. The aforementioned area where the steam S is mainly released is referred to as the foodstuff accommodating chamber 22C. When the power of the electricity-heat conversion unit 16 is 1.5 kW, 5-liter, 9-liter, and 14-liter foodstuff accommodating chambers 22C may be filled with steam and the temperature thereof may be raised to a stable cooking temperature within about 1, 2, and 3 minutes respectively from the beginning of the releasing steam. If the foodstuff accommodating chamber 22C is 20 liters, the foodstuff accommodating chamber 22C may be filled with steam and the temperature thereof may be raised to a stable cooking temperature in about 5 minutes. An example of the aforementioned cooking temperature is 101° C. to 150° C.; an exemplary cooking temperature is 101° C. to 130° C.; an improved exemplary cooking temperature is 101° C. to 110° C.; and a further improved exemplary cooking temperature is 103° C. to 106° C.

In addition, with the application of high-pressure saturated vapor, even when the consumed power of the electricity-heat conversion unit 16 is limited, the electricity-heat conversion unit 16 may still effectively heat a large-volume foodstuff accommodating chamber 22C within a short amount of time. For example, based on the design of this embodiment, starting from the steam S being inputted into the foodstuff accommodating chamber 22C with a volume of V1 liter(s) and at a room temperature to the time when the foodstuff accommodating chamber 22C is filled with the steam S and heated to the cooking temperature, the power consumption of the electricity-heat conversion unit 16 is WH1 kWh. When V1/WH1 is greater than or equal to 100, 160, 200, and 300, a good heating efficiency, a preferable heating efficiency, a more preferable heating efficiency, and a further preferable heating efficiency are achieved respectively. In this embodiment, in the aforementioned example where V1 is 5 liters, the heating-up period is 1 minute, and the rated power of the electricity-heat conversion unit is 1.5 kW, the power consumption during the heating-up period is about 0.025 kWh, and V1/WH1 is about 200. Accordingly, by limiting the volume of the foodstuff accommodating chamber 22C, the time required to raise the temperature may be reduced, so as to avoid the difficulty of controlling the quality of foodstuff caused by a long heating-up period. At the same time, high-pressure steam may effectively prevent foodstuff from being charred, effectively reduce the cooking time of the foodstuff, and retain the taste of the foodstuff.

In addition, during the steaming mode, when the liquid water L of the heating kettle 12 is below the lowest sensing point 13A of the lowest end of the liquid level sensor 13, the liquid level sensor 13 determines that the liquid level is lower than the lowest predetermined water level height H1 (also referred to as the water injection line). At this time, the liquid level sensor 13 outputs a corresponding water level signal to the first control element 42 in the control module 40, and the first control element 42 executes a water refill procedure according to the aforementioned water level signal. During the water refill procedure, a predetermined water refill volume is injected into the heating kettle, so as to raise the water level in the heating kettle from the lowest predetermined water level height H1 to the highest water refill water level height H2 (also referred to as the maximum water line). That is, in this embodiment, the predetermined water refill volume is a fixed amount, and for this purpose, the activation time of the water refill device 32 is also fixed.

It is to be noted that by adding a low-temperature liquid water L into the heating kettle 12, the temperature of the liquid water L in the heating kettle 12 is lowered. If too much liquid water L is added, the temperature of the liquid water L in the heating kettle 12 drops significantly, which causes the generation of steam S to be interrupted and affects steam supply quality. Referring to FIG. 3, when a predetermined water refill volume V2 (in liters) divided by the rated power W1 (in kW) of the electricity-heat conversion unit 16 is less than or equal to a specific value, since the power of the electricity-heat conversion unit 16 is sufficient to heat the cooled liquid water L back to the saturated vapor temperature within a short amount of time, the water refill does not excessively affect the generation of steam. That is, when the predetermined water refill volume V2 (in liters) divided by the rated power W1 (in kW) of the electricity-heat conversion unit 16 is less than or equal to 0.1, 0.05, 0.03, and 0.01, a good effect, a preferable effect, a more preferable effect, and a further preferable effect are achieved respectively. In each water refill period, when the liquid water is cooled at an average temperature drop rate of 2° C., 1° C., 0.5° C., and 0.2° C. or below 0.2° C. per second, a good effect, a preferable effect, a more preferable effect, and a further preferable effect are achieved respectively. For example, in this embodiment, each time the water refill procedure is executed, 0.044 liter of liquid water L is injected in 5.9 seconds. In conversion, the ratio of V2/W1 is about 0.029. During the water refill period, the temperature drop of the liquid water in the heating kettle 12 is only 2.6° C., and the average temperature drop rate is 0.44° C. per second. Incidentally, an exemplary flow rate per second of the water refill volume is not lower than the average consumption volume during the steaming mode, but the flow rate per second of the water refill volume is not limited thereto. In the steaming mode of this embodiment, the average steam S consumption volume for 500 seconds is 240 ml, and the average consumption is about 28.8 ml per minute.

In addition, referring to FIG. 3, when the predetermined water refill volume V2 (in liters) accounts for less than a specific proportion of a maximum volume V3 (in liters) of the heating kettle 12, the water refill does not excessively affect the generation of steam to an extent. When the steam cooking device 1 satisfies the condition that V2/V3 is less than or equal to 0.1, 0.07, 0.04, and 0.02, a good effect, a preferable effect, a more preferable effect, and a further preferable effect are achieved respectively. For example, in this embodiment, each time the water refill procedure is executed, the predetermined water refill volume V2 is 0.044 liter, and the maximum volume V3 of the heating kettle 12 is 1.155 liters, and the ratio is about 0.038.

In addition, based on the design of providing high-pressure steam, accidental releases of latent heat which causes liquefaction of the steam during the transportation process may be reduced, which effectively allows the steam S to maintain in a high dryness state before the steam S reaches the surface of the foodstuff F, so as to reduce the chance of formation of a liquid water film and to effectively transfers the latent heat of the steam to the foodstuff. In this way, the foodstuff is cooked in a very short time, and the fresh and tender taste of the foodstuff is retained.

In practical application of an embodiment of the disclosure, when the rated power of the electricity-heat conversion unit 16 is 1.5 kWh, the steam cooking device 1 of the disclosure completes the steaming procedure of a 450 g fish within six minutes from the steam being released from the foodstuff accommodating chamber 22C, such that the fish is thoroughly cooked and a silky and tender taste is retained. On the contrary, the procedure of steaming fish with existing steam cooking devices takes fifteen to twenty minutes or more. Therefore, the disclosure has distinct features thereof compared with the aforementioned procedure. In addition, although the foodstuff accommodating chamber 22C in this embodiment is smaller than a traditional large steamer chamber, since the time required for steaming of the steam cooking device 1 in an embodiment of the disclosure is significantly shorter, multiple dishes may still be completed within the same or a shorter amount of time.

Furthermore, different from the mechanism in the related art in which the steam S is outputted from the heating kettle 12 and then heated to a temperature over 200° C. as a superheated steam which is utilized to heat the foodstuff, in an embodiment of the disclosure, the temperature of the steam S released from the steam releasing device 24 is lower than the temperature of the saturated vapor in the pressure accumulating steam boiler 10.

On the other hand, by increasing the height difference between the liquid surface of the liquid water L in the heating kettle 12 and the steam outlet of the heating kettle 12, liquid water L molecules may be prevented from being accidentally carried away from the heating kettle 12 by the steam S when the liquid water L is boiling, which further increases the steam dryness. By configuring the steam outlet at a higher place or the top of the heating kettle 12 and controlling the ratio of the height between the liquid surface of the liquid water L and the steam outlet to the height between the liquid surface of the liquid water L and the bottom of the heating kettle 12 to be below a specific number, or maintaining the difference between the aforementioned two heights to be no less than a minimum height difference, the possibility of liquid molecules returning to the liquid surface under the action of gravity may be increased, such that the chance of liquid particles being accidentally carried away is reduced.

Referring to FIG. 3, FIG. 3 shows that when the water level sensor 13 in the heating kettle 12 determines that the water level is lower than the lowest predetermined water level height H1 (also referred to as the water injection line), the control module 40 controls the water refill device 32 to supplement water to the heating kettle 12 and raise the liquid surface to the highest water refill water level height H2 (also referred to as the maximum water line). The lowest predetermined water level height H1 is close to the highest water refill water level height H2, and the lowest predetermined water level height H1 is the same as the height of the lowest sensing point 13A of the liquid level sensor 13. Furthermore, by optionally configuring a water blocking module P between the liquid surface in the heating kettle 12 and the steam outlet of the heating kettle 12, splashing liquid water L due to boiling may be effectively blocked, so as to achieve the purpose of increasing the dryness of the steam S. The water blocking module may refer to a unit that is freely configured between the predetermined height H1 and the steam outlet of the heating kettle 12 to block the liquid water L or allow the liquid water L to adhere thereto. In addition, by adjusting the height H3 of the steam outlet of the heating kettle 12, the dryness of the steam S may also be increased to a certain extent.

In summary, the steam cooking device in an embodiment of the disclosure may prevent foodstuff from becoming dry and reduce the cooking time through the application of high-pressure steam. Also, in an embodiment of the disclosure, a cooking device that quickly cooks multiple dishes, accurately controls the heating degree of the foodstuff and the cooking effect, and accurately reproduces and controls the cooking results of the foodstuff without having the needs to preheat, to utilize a high temperature, and to enlarge the foodstuff accommodating chamber is provided.

Finally, it is emphasized that the constituent units disclosed in the aforementioned embodiments of the disclosure are merely examples and are not intended to limit the scope of the disclosure. Other equivalent units as substitutes shall also be covered by the scope of the disclosure.

What is claimed is:

1. A steam cooking device comprising:
a pressure accumulating steam boiler, adapted for heating a liquid water and accumulating a steam having a pressure between 1.1 to 5.0 times the atmospheric pressure, wherein a temperature of the steam in the pressure accumulating steam boiler is not lower than a saturated vapor temperature, the saturated vapor temperature corresponds to a pressure of the steam in the pressure accumulating steam boiler, and the pressure accumulating steam boiler comprises:
a heating kettle, adapted for storing the liquid water and accumulating the steam; and
an electricity-heat conversion unit, configured in the heating kettle, wherein the electricity-heat conversion unit is adapted for heating the liquid water and generating the steam; a steaming cabinet, connected to the pressure accumulating steam boiler, wherein the steaming cabinet is adapted for receiving the steam from the pressure accumulating steam boiler to cook a foodstuff contained in the steaming cabinet, and the steaming cabinet comprises:
a foodstuff accommodating chamber, adapted for containing the foodstuff; and
a steam releasing device, connected to the foodstuff accommodating chamber and the heating kettle, wherein the steam releasing device is adapted for inputting the steam of the heating kettle into the foodstuff accommodating chamber;
a water refill device, connected to the heating kettle and a water source, wherein the water refill device is adapted for inputting a liquid water of the water source into the heating kettle; and
a control module, electrically connected to the steam releasing device and the water refill device, wherein the control module is adapted for controlling the water refill device to be turned on and off to input the liquid water into the heating kettle to allow a water level in the heating kettle to maintain at or over a predetermined height, an average temperature drop of the liquid water in the heating kettle is lower than or equal to 2° C. per second during a water refill period, a water refill volume of the liquid water is not determined by a temperature of the steam in the heating kettle, and the control module controls the steam releasing device to input a steam volume into the foodstuff accommodating chamber to maintain the temperature of the steam in the heating kettle and releases an accumulated high-pressure steam containing a latent heat to the foodstuff to reduce a degree of dryness decrease of the steam before the steam reaches the surface of the foodstuff, allow the steam in the foodstuff accommodating chamber to contain the latent heat during a process of the heat being transferred to the foodstuff to reduce a formation of a liquid water film, and allow the steam to transfer the latent heat of the steam to the foodstuff more effectively when the heat contacts the foodstuff so that the foodstuff is heated by the latent heat released by the steam;

wherein a volume of the foodstuff accommodating chamber is V1 liter(s), a power consumption required for the electricity-heat conversion unit to raise a temperature in the foodstuff accommodating chamber from a room temperature to a cooking temperature is WH1 kWh, the steam cooking device satisfies a condition of $V1/WH1 \geq 160$ so as to raise the temperature in the foodstuff accommodating chamber with the foodstuff from the room temperature and maintain the temperature at the cooking temperature, the cooking temperature is greater than 100° C. and less than or equal to 106° C., and the cooking temperature is lower than or equal to a temperature when the steam is outputted from the heating kettle.

2. The steam cooking device according to claim 1, wherein a time required for the electricity-heat conversion unit to raise the temperature in the foodstuff accommodating chamber from the room temperature to the cooking temperature is less than or equal to 5 minutes.

3. The steam cooking device according to claim 1, wherein a difference between a temperature of the steam released by the steam releasing device and a temperature of the saturated vapor in the accumulating steam boiler is not more than 30° C.

4. The steam cooking device according to claim 1 further comprising a movable unit, wherein the movable unit is configured in the steaming cabinet, adapted for reducing a time required for heating the foodstuff accommodating chamber to the cooking temperature.

5. The steam cooking device according to claim 1 further comprising:
- a liquid level sensor, configured in the heating kettle, adapted for measuring a liquid level in the heating kettle and outputting a water level signal when the liquid level in the heating kettle is lower than the predetermined height;
- the control module adapted for controlling the water refill device to be turned on and off according to the water level signal to input a predetermined water refill volume of the liquid water into the heating kettle; and
- an electronic steam valve, adapted for adjusting a supply volume of the steam from the heating kettle to the foodstuff accommodating chamber to adjust the cooking temperature of the foodstuff accommodating chamber.

6. The steam cooking device according to claim 5, wherein the predetermined water refill volume is V2 liter(s), a rated power of the electricity-heat conversion unit is W1 kW, and the steam cooking device satisfies a condition of $V2/W1 \leq 0.1$.

7. The steam cooking device according to claim 5, wherein a volume of the heating kettle at the predetermined height is V4 liter(s), a rated power of the electricity-heat conversion unit is W1 kW, and the steam cooking device satisfies a condition of $V4/W1 \leq 0.3$.

8. The steam cooking device according to claim 5, wherein the predetermined water refill volume is V2 liter(s), a maximum volume of the heating kettle is V3 liter(s), and the steam cooking device satisfies a condition of $V2/V3 \leq 0.1$.

9. The steam cooking device according to claim 5, wherein the steam cooking device meets any one of the following conditions:
- the control module controlling an activation time of the water refill device to be fixed or the predetermined water refill volume to be a fixed volume; or
- the electricity-heat conversion unit comprising a resistor, wherein the resistor is entirely configured below the predetermined height.

10. The steam cooking device according to claim 1, wherein the control module is electrically connected to the electricity-heat conversion unit;
wherein the steam cooking device comprises at least one of a first preparation mode and a second preparation mode, wherein in the first preparation mode, the control module controls the electricity-heat conversion unit to heat the liquid water and allow the liquid water in the heating kettle to maintain at a preliminary temperature, and the preliminary temperature is lower than the temperature of the saturated vapor in the heating kettle; and in the second preparation mode, the control device controls the electricity-heat conversion unit to heat the liquid water and allow the heating kettle to accumulate a saturated vapor having a pressure between 1.1 and 5.0 times the atmospheric pressure.

\* \* \* \* \*